United States Patent [19]

Smedley

[11] Patent Number: 4,737,954
[45] Date of Patent: Apr. 12, 1988

[54] SUBSCRIBER LINE SIGNALLING DEVICE FOR USE IN A TELECOMMUNICATIONS SYSTEM

[75] Inventor: Colin P. Smedley, Fawley, England

[73] Assignee: Plessey Overseas Limited, Ilford, England

[21] Appl. No.: 802,140

[22] Filed: Nov. 27, 1985

[30] Foreign Application Priority Data

Nov. 28, 1984 [GB] United Kingdom ............... 8430005

[51] Int. Cl.$^4$ ............................................. H04J 3/12
[52] U.S. Cl. ..................................... 370/110.1; 371/69
[58] Field of Search ............... 370/100, 105, 106, 108, 370/110.1, 13; 375/106, 114, 116, 111; 371/42, 49, 69

[56] References Cited

U.S. PATENT DOCUMENTS

| | | | |
|---|---|---|---|
| 3,863,215 | 1/1975 | McGrogan, Jr. ..................... | 371/69 |
| 4,004,100 | 1/1977 | Takimoto ............................ | 370/106 |
| 4,302,836 | 11/1981 | Bouvier d'Ivoire et al. ......... | 370/13 |
| 4,413,336 | 11/1983 | Chaillie et al. ...................... | 370/106 |
| 4,472,811 | 9/1984 | Froggatt ............................. | 375/111 |

Primary Examiner—Robert L. Griffin
Assistant Examiner—Stephen Chin
Attorney, Agent, or Firm—Michael F. Oglo; Julian C. Renfro

[57] ABSTRACT

The subscriber line signalling device (D) is employed in a digital telecommunications system. In particular the device (D) is used in a subscriber line interface module and it allows all signalling data to be detected and generated on a per-channel basis. A microprocessor (A) controls the device which generates and detects cyclically permutable code words on a plurality of traffic channel paths to or from the device. It is arranged that each generated cyclically permutable code word on any one traffic channel path is synchronously coded with respect to any other traffic channel path. The device can also be programmed to handle different data rates. In addition the operational modes of the traffic channels can be controlled giving loopback facilities allowing cyclically permutable code words to be generated and detected from the input and output traffic channels as desired and allow a diagnostic facility to be implemented.

13 Claims, 12 Drawing Sheets

| ADDRESS H | WORD |
|---|---|
| 0 | INTERRUPT STATUS |
| 1 | CPC I/O CHANNEL A |
| 2 | CPC I/O CHANNEL B |
| 3 | CPC I/O CHANNEL C |
| 4 | CPC I/O CHANNEL D |
| 5 | CPC I/O CHANNEL E |
| 6 | CPC I/O CHANNEL F |
| 7 | 0 |
| 8 | 0 |
| 9 | MODE SELECT |
| A | DIAGNOSTIC SELECT |
| B | CHANNEL ENABLE |
| C | DEVICE CONTROL |
| D | TEST X |
| E | TEST Y |
| F | TEST Y |

|  | MSB | | | | | | | LSB | |
|---|---|---|---|---|---|---|---|---|---|
| ADDRESS 0 | 0 | 0 | INTF | INTE | INTD | INTC | INTB | INTA | INTERRUPT STATUS READ ONLY |
| ADDRESSES 1-6 | IN7 | IN6 | IN5 | IN4 | IN3 | IN2 | IN1 | IN0 | RECEIVED CPC READ ONLY |
| ADDRESSES 1-6 | OUT7 | OUT6 | OUT5 | OUT4 | OUT3 | OUT2 | OUT1 | OUT0 | SEND CPC WRITE ONLY |
| ADDRESSES 7&8 | 0 | 0 | 0 | 0 | 0 | 0 | 0 | 0 | READ ONLY |
| ADDRESS 9 | 0 | 0 | MODE F | MODE E | MODE D | MODE C | MODE B | MODE A | MODE CONTROL |
| ADDRESS A | 0 | 0 | DIAG F | DIAG E | DIAG D | DIAG C | DIAG B | DIAG A | DIAGNOSTIC CONTROL |
| ADDRESS B | 0 | 0 | ENABLE F | ENABLE E | ENABLE D | ENABLE C | ENABLE B | ENABLE A | CHANNEL ENABLE |
| ADDRESS C | 0 | 0 | 0 | 0 | DATA RATE B | DATA RATE A | 16K 32K SIG | RESET | DEVICE CONTROL |
| ADDRESS D | 0 | 0 | TEST FX | TEST EX | TEST DX | TEST CX | TEST BX | TEST AX | TEST X READ ONLY |
| ADDRESSES E&F | 0 | 0 | TEST FY | TEST EY | TEST DY | TEST CY | TEST BY | TEST AY | TEST Y READ ONLY |

*Fig. 6*

SUBSCRIBER LINE SIGNALLING DEVICE FOR USE IN A TELECOMMUNICATIONS SYSTEM

FIELD OF THE INVENTION

This invention relates to a subscriber line signalling device for use in a telecommunications system. The invention has particular application to digital telecommunication exchange systems employing cyclically permutable codeword (c.p.c.) signalling.

BRIEF SUMMARY OF INVENTION

According to the present invention there is provided a subscriber line signalling device for use in a subscriber line interface module of a digital telecommunications system in which the device, being controlled by a microprocessor is arranged to generate and detect cyclically permutable code words on any of a plurality of independent traffic channel paths to or from the device respectively, each generated cyclically permutable code word on any one traffic channel path being synchronously coded with respect to any other channel path of the plurality of traffic channel paths by clock timing means.

BRIEF DESCRIPTION OF DRAWINGS

The invention will be better understood from the following description of an exemplary embodiment, which should be read in conjunction with the accompanying drawings, in which;

FIG. 6 shows the bit allocation within the bytes;

DETAILED DESCRIPTION OF INVENTION

Figure 1:
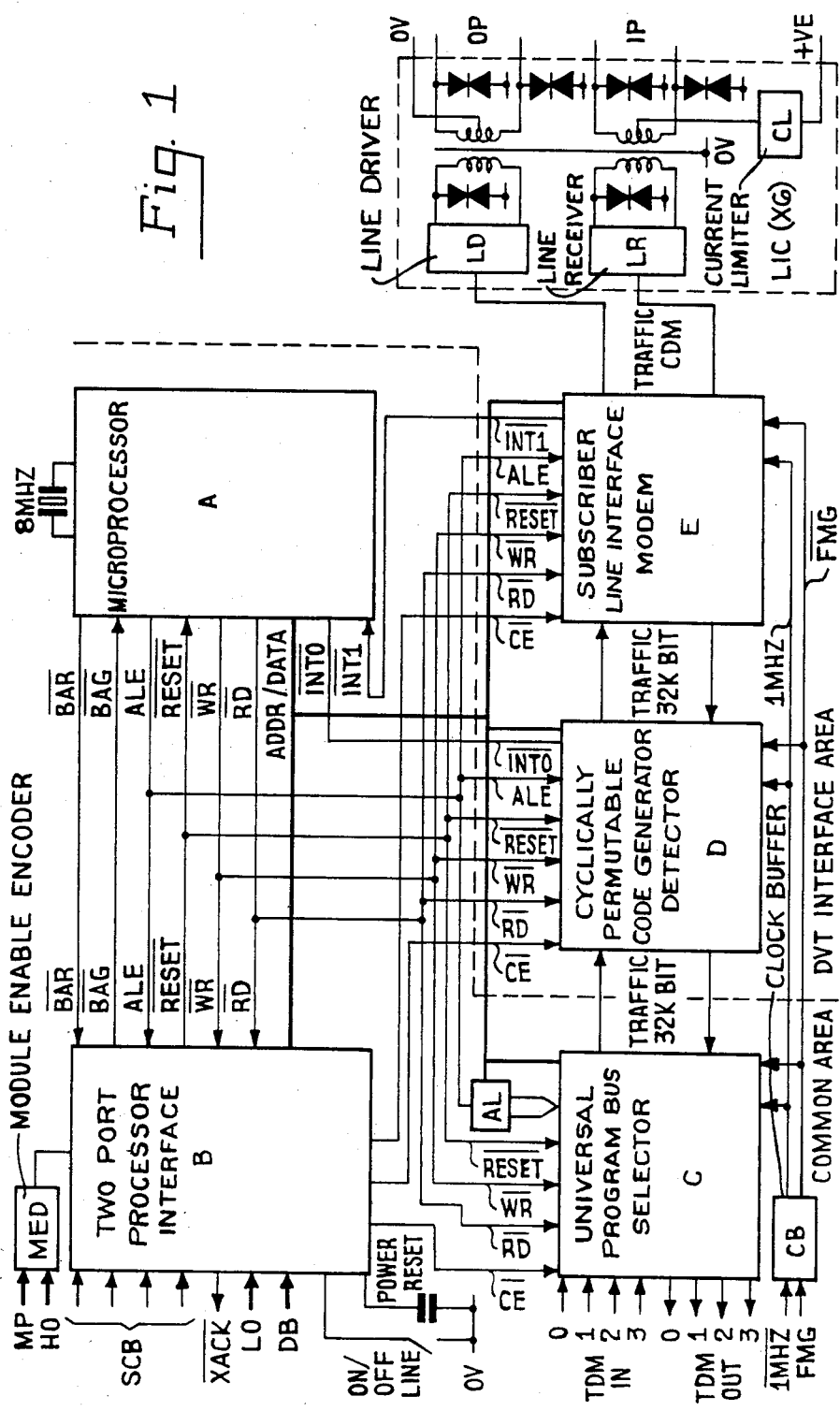
FIG. 1 shows a block schematic diagram which illustrates the application of a c.p.c. generator detector in a six-channel subscriber interface module.

Referring to FIG. 1, which shows a microprocessor A controlling a 32 byte two port processor interface B, a universal program bus selector C, a subscriber line signalling device or cyclically permutable code generator detector D, with which this invention is concerned, and, a subscriber line interface modem E.

The microprocessor A communicates with the units B-E by way of the address/data bus ADDR/DATA. The microprocessor A receives signal $\overline{\text{INTO}}$ from unit E, generates signals $\overline{\text{RD}}$, $\overline{\text{WR}}$, for units B-E, signal ALE for units B, D, E and address latch AL and request signal $\overline{\text{BAR}}$ for unit B. Unit B acts as a two port buffer with arbitration between the shelf system bus and the microprocessor A. Unit B receives shelf control bus signals SCB and generates a transfer acknowledgement signal $\overline{\text{XACK}}$ and a signal $\overline{\text{RESET}}$.

A low order shelf address bus LO, and a high order shelf address bus HO is provided, the latter being connected to a module enable decoder MED, which receives a module position address bus MP. A data bus DB feeds into and out of the unit B. Unit B generates a decode signal $\overline{\text{CE}}$ for units C, D and E and a request granted signal $\overline{\text{BAG}}$ for the microprocessor A.

The universal programmable bus selector C provides a common interface between six single channel digital traffic terminations operating at 32K bits per second. It receives TDM signals at 1 M bit per second and transmits TDM signals out at 1 M bit per second. The unit has an address latch input to which the address latch AL is connected.

The units A, B and C belong to a common area and the units D and E belong to a digital voice terminal interface area.

The cyclic permutable code generator detector D detects and generates cyclically permutable codewords for any of six independent channels and is controlled by a standard microprocessor interface. Eleven registers provide command and status information for full control. A codeword is detected if incoming serial data contains any eight bit word repeated six times consecutively. Generation of a codeword is by continuous serial transmission of a data byte loaded by the control interface. The unit D receives traffic from units C and E and transmits traffic to units C and E.

The subscriber line interface modem E interfaces between the multiplexed traffic highways from unit D and six line interface circuits LIC forming channel rate four wire digital voice terminal loops to the subscribers.

Each of the units C, D and E receive a framing and a 1 MHz clock signal from a clock buffer CB.

Each line interface circuit comprises trapezoidal line drivers LD, line receivers LR and a current limiter CL. The subscriber line inputs are shown as IP and the outputs OP.

GENERAL OUTLINE

The subscriber line signalling device or cyclic permutable code generator detector D is arranged to detect and generate cyclically permutable codewords (c.p.c.) on any of six independent channels and is controlled by a standard microprocessor interface. Eleven registers provide command and status information for full device control. It is arranged that a c.p.c. is detected if incoming serial data contains any eight bit word repeated six times consecutively and that c.p.c. generation is a continuous serial transmission of data byte loaded by the control interface. Selectable comprehensive loopround modes allow the device, which is packaged in a 68 pin chip carrier, to be used in a variety of signalling and diagnostic applications.

Figure 3:
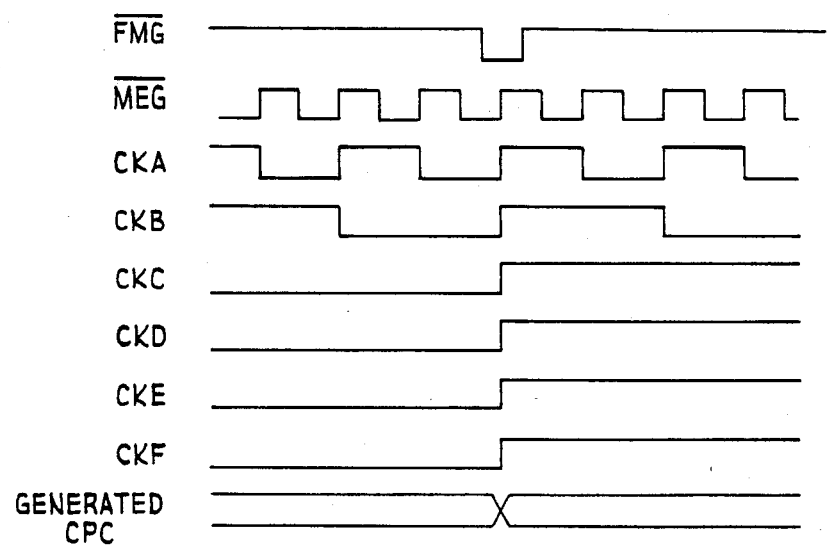
FIG. 3 shows a clock output timing diagram.

FIG. 1 illustrates a schematic diagram of the device D, ADDR/DATA representing the main address/data bus, other signals corresponding to those shown in FIG. 1 are as indicated, 32 kb/sec traffic passes to and from the device and the universal programmable bus selector C by way of traffic ports PORT A IN and PORT B OUT and similarly to and from the subscriber line interface modem E by way of traffic ports PORT B IN and PORT B OUT. CLK represents the clock supplies which comprise the following:

Signals CKA, CKB, CKC, CKD, CKE and CKF are derived from the 1 MHz and framing input signals and are aligned as shown in FIG. 3. TABLE 1 should also be referred to. These signals may be used for multiplex/demultiplex functions on the traffic ports. The following inputs are provided to allow greater flexibility of operation.

Figure 2:
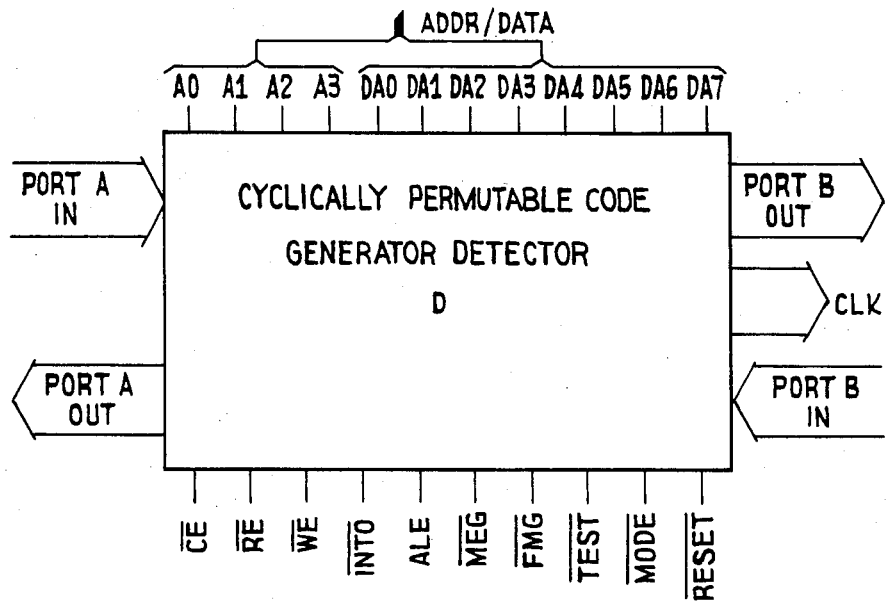
FIG. 2 shows a schematic diagram of a c.p.c. generator detector.

A0 to A3—Non-multiplexed address inputs selectable by the MODE input (FIG. 2),

TEST—Select test mode—provided for test purposes.

TABLE 1

| CLOCK OUTPUTS GENERATED | |
|---|---|
| | Frequency |
| Clock A (CKA) | 512 kHz |
| Clock B (CKB) | 16 × (Signalling Frequency) |
| Clock C (CKC) | 8 × (Signalling Frequency) |
| Clock D (CKD) | 4 × (Signalling Frequency) |
| Clock E (CKE) | 2 × (Signalling Frequency) |
| Clock F (CKF) | Signalling Frequency |

GENERAL FUNCTIONAL DESCRIPTION

Figures 4, 5:
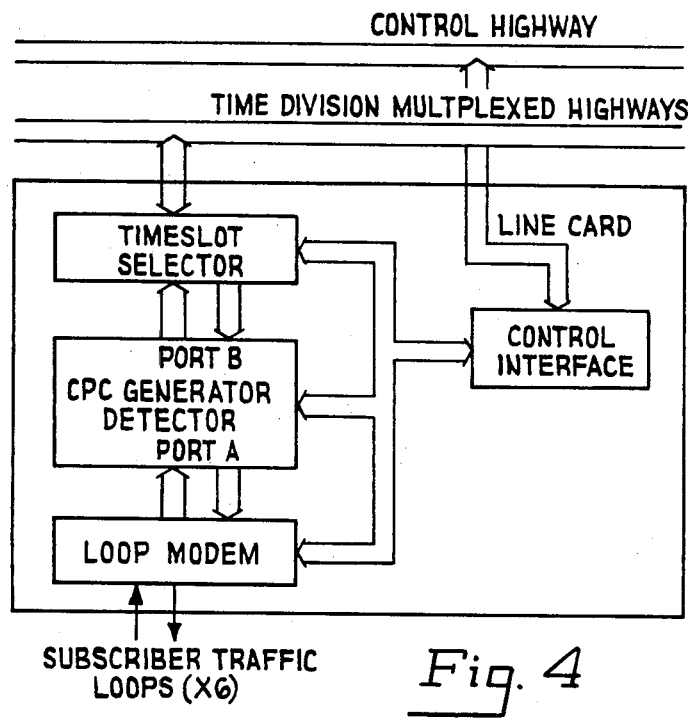
FIG. 4 shows a block schematic diagram of the line card application of the c.p.c. generator detector.
FIG. 5 shows a table which illustrates the address structure used within the c.p.c. generator detector.

This c.p.c. generator detector interfaces six individual traffic channel paths in both send and return directions (FIG. 4). All traffic timing is synchronised by a single framing pulse FMG. Subsequent occurrences of the framing pulse may occur up to a frequency equal to the signalling rate.

A c.p.c. detector is allocated to each channel. The detector recognises a serial data stream consisting of any eight-bit word repeated six times (48 bits total). If such a code is detected it is then reported as a c.p.c. to the microprocessor A. Repeat occurrences of that same word are ignored.

A c.p.c. generator is also allocated to each channel. An eight-bit word is loaded by the control interface to a channel address. This word is then multiplexed into a continuous serial data stream. All channel multiplexers operate synchronously.

Programmable Control Facilities

Referring now to FIG. 5 and FIG. 6, it should be understood that the c.p.c. generator detector contains four read/write registers, seven read only registers and six write only registers. There are also three address locations reserved for functional testing purposes.

Address Locations and Bit Allocations

FIG. 5 shows the address locations used within the device. Bit allocations within the bytes are shown in FIG. 6.

Control Information

Control information is loaded or read via eight bidirectional data lines under the control of the read, write and chip enable lines and an address latch is also used in multiplex mode.

Interrupt Status

This read only register contains status information for channels A to F using bits 0 to 5 respectively. If any c.p.c. is detected then an interrupt signal is generated. Reading the interrupt status register indicates the channel/s that initiated that interrupt (1=interrupt). Reading the associated 'Received c.p.c.' register automatically clears this bit.

Received C.P.C.

This read only register contains the code of the most recently received or old c.p.c. The c.p.c. detector operates continuously. If at any time a subsequent or new c.p.c. is detected then this register will be re-loaded, whether or not the interrupt status flag is set. Re-loading will only be inhibited if the processor is engaged in a read cycle of this register. If a c.p.c. load is inhibited in this way the c.p.c. generator detector will make seven more attempts at 1 µs intervals (16 kb signalling), if all of these fail (due to the processor read) a completely new detection cycle will be initiated.

It should be noted that a c.p.c. is recognised in any rotation. Hence if the last few bits of the most recently received or old c.p.c. can be interpreted as the start of the next c.p.c. then the new code will be recognised earlier, and in a different rotation to that expected.

Send C.P.C.

This write only register is loaded with the c.p.c. code required to be generated. The generator operates continuously and cyclically transmits the byte loaded starting with bit 7.

MODE Command

Bits 0 to 5 control the operational mode of channels A to F respectively. In normal operation logic 1 sets traffic mode, logic 0 sets signalling mode (see FIG. 7).

However if the channel is operating under the diagnostic facility the MODE commands will force bus testing when set to 1 and self test when set to 0. (See FIG. 7).

Diagnostic Command

Figure 7:
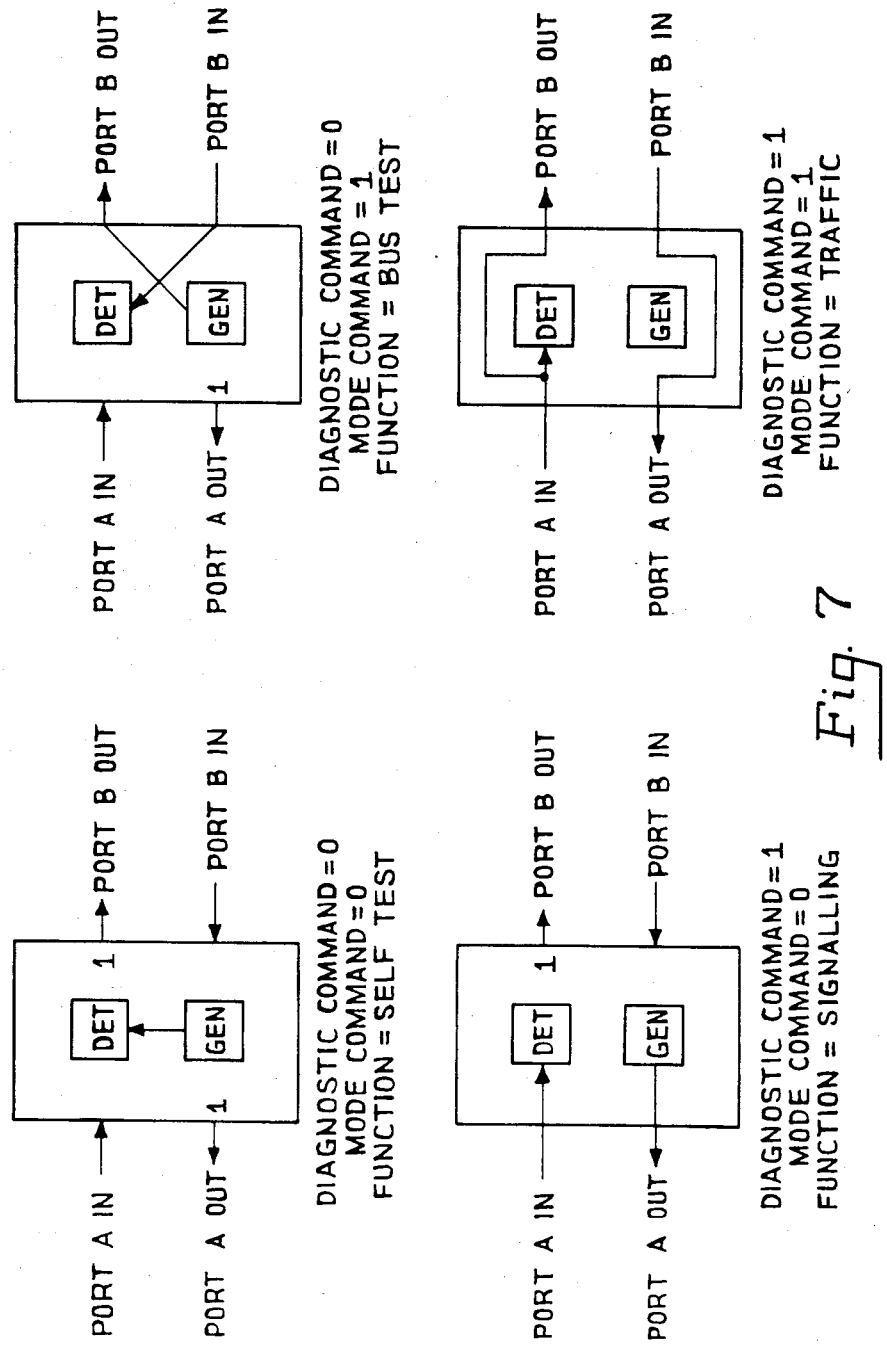
FIG. 7 shows the arrangements of the channel loopround modes available using the MODE and DIAGNOSTIC commands.

Bits 0 to 5 control the diagnostic facility of channels A to F respectively. Setting a bit to 0 will enable the diagnostic facility of that channel (FIG. 7). This must be used in conjunction with the MODE command to select the required loopround.

Channel Enable

Bits 0 to 5 control channels A to F respectively. Logic 1 enables the channel into normal operation. Logic 0 will initiate a complete channel reset. All status and control bits associated with that channel will be cleared to logic 0; this affects interrupt status, receive and send c.p.c., mode and diagnostic registers.

Device Control

Commands in this register affect total device operation.

When bit 0 is set to logic 1 it clears all other register bits to logic 0. This reset facility eases initialisation after a system crash. Applying a reset will force all outputs into a high impedance state.

Bit 1 determines the signalling rate of all channels. A logic 0 forces 16 kbit/sec signalling. Logic 1 forces the device to 32 kbit/sec signalling.

Bits 2 and 3 control the sampling point used by all the channel detectors. This facility enables the device to accept signalling information that is superimposed upon a faster data rate. The data rates that may be commanded are shown in Table 2 (See also FIG. 8).

TABLE 2

| DATA RATE COMMANDS | | |
|---|---|---|
| Bit 3 | Bit 2 | Data Rate |
| 0 | 0 | Signalling rate |
| 0 | 1 | 2 × (Signalling rate) |
| 1 | 0 | 4 × (Signalling rate) |
| 1 | 1 | 8 × (Signalling rate) |

Bits 4, 5, 6 and 7 are read only bits and are set to logic 0.

TEST X

This read only address monitors internal test points. Test points for channels A to F are represented by bits 0 to 5. No test points are used during functional operation.

TEST Y

These read only addresses also monitor internal channel test points. Channels A to F are represented by bits 0 to 5.

Hardware Control Facilities

Four data ports provide traffic routing for each channel. The various functions are as shown in FIG. 7. All traffic drivers are of open drain type.

MODE

When set low this input enables the four bit address bus for internal register addressing. If set high it will disable the external address bus and select the latched data bus inputs for multiplexed addressing.

ALE

ALE (Address Latch Enable) is used to latch into the address decoder an address set on the four least significant bits of the data bus. This input is normally set low if direct addressing has been selected. The address is latched on the low going edge of ALE.

$\overline{\text{FRAMING}}$ ($\overline{\text{FMG}}$)

Only one pulse of the framing input is necessary to synchronise the device. Subsequent pulses up to the signalling rate may be used. Framing operation is synchronous and active low.

$\overline{\text{RESET}}$

This input has the same effect as the software reset bit. When active all registers are cleared to the 0 state including the software reset bit.

$\overline{\text{INTERRUPT}}$ ($\overline{\text{INTO}}$)

This output will be active if any bit in the interrupt status register is set to logic 1. Output drive is open drain to allow wired or connection of multiple devices.

$\overline{\text{WRITE ENABLE}}$ ($\overline{\text{WE}}$)

Data input on the tri-state data bus is enabled into an addressed register when this pin and $\overline{\text{CHIP ENABLE}}$ are both held low. Data is latched on the rising edge of $\overline{\text{WRITE ENABLE}}$.

$\overline{\text{READ ENABLE}}$ ($\overline{\text{RE}}$)

Data in an addressed register is enabled onto the tristate data bus if this pin and $\overline{\text{CHIP ENABLE}}$ are held low.

$\overline{\text{CHIP ENABLE}}$ ($\overline{\text{CE}}$)

If this signal is not set all data lines are disabled. This reduces power consumption when other devices are using the control bus. This pin also disables the $\overline{\text{READ}}$ and $\overline{\text{WRITE}}$ inputs to allow memory mapping of the device.

CKA-CKF OUTPUTS

These clock outputs are used to synchronously drive associated circuitry around the device (i.e. multiplexers and demultiplexers). Frequencies available are dependent upon the programmed signalling frequencies. (Table 1). Clocks will count down (+ve edge aligned). See FIG. 3.

$\overline{\text{TEST}}$

This input (active low) will force an internal test configuration within the device. It must be disconnected (float high) during normal operating conditions. When test is active the stage 2 FRAME counter will count at the same rate as the timeslot stage 1 counter. Used in conjunction with $\overline{\text{FRAMING}}$ all circuitry associated with the frame counter will be isolated to run at the new clock frequency.

MEG

Figure 8:
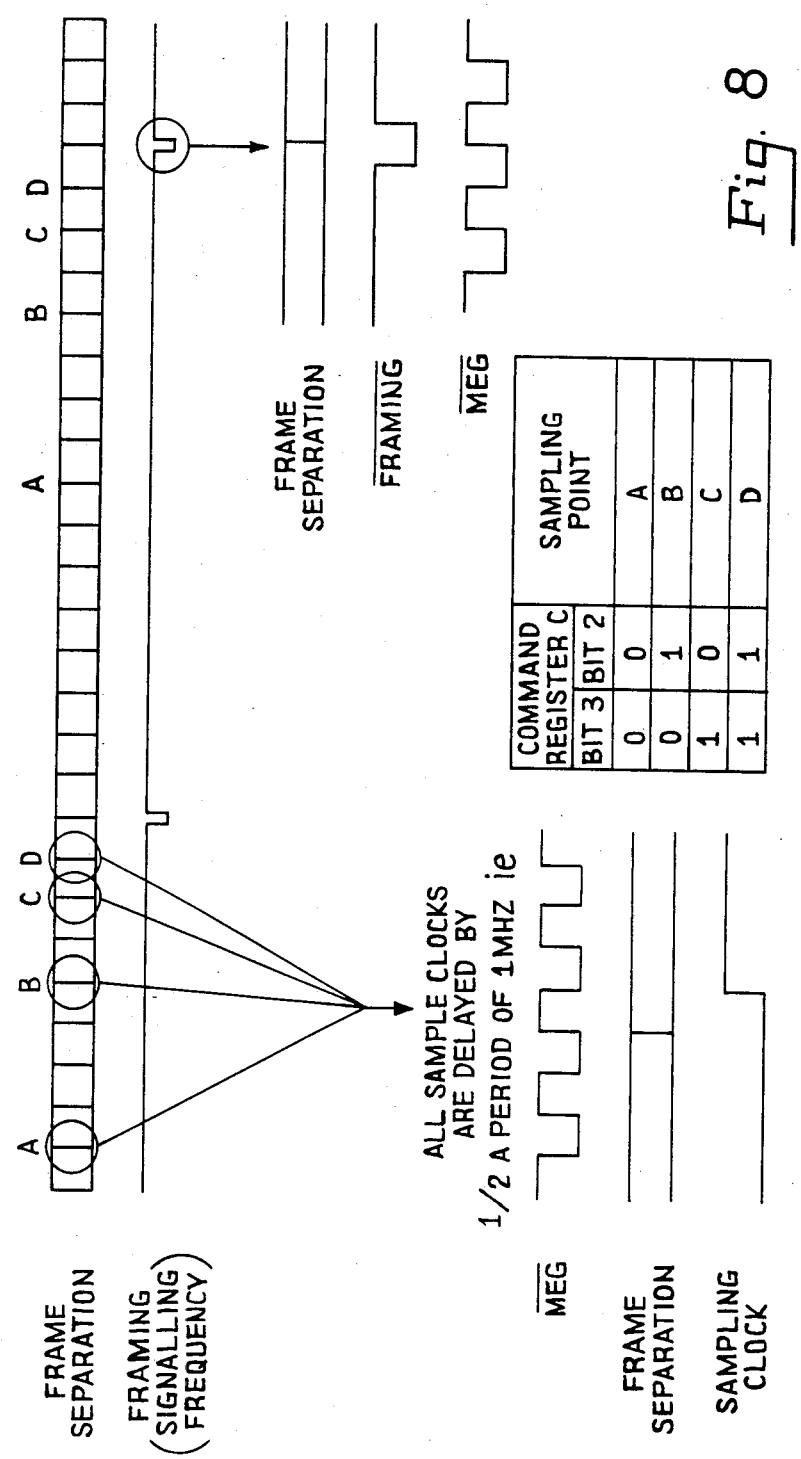
FIG. 8 shows waveforms relating to the sampling point control.

This is the master clock input of the digital telecommunication system and is used to drive all synchronous device operations. Normal operating frequency is 1 MHz. Timing relationships between this input and other device functions are shown in FIG. 3 and FIG. 8.

DETAILED DESCRIPTION OF TIMING

The timings given in this section represent the worst case delays over the permitted process spreads and an operating free air temperature of −55° C. to +125° C. Power supply limits of 5 v±10% are assumed. Timings also include a load on all outputs of 50 pF and are given in nano seconds.

Control Timing

Figure 9:
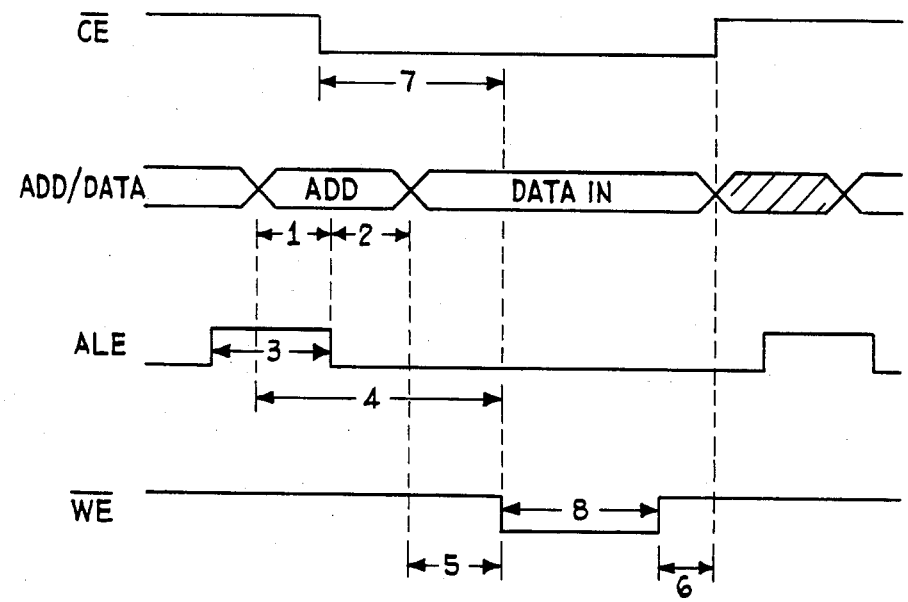
FIG. 9 shows various waveforms concerned with the bus interface write cycle multiplex mode.
Figure 10:
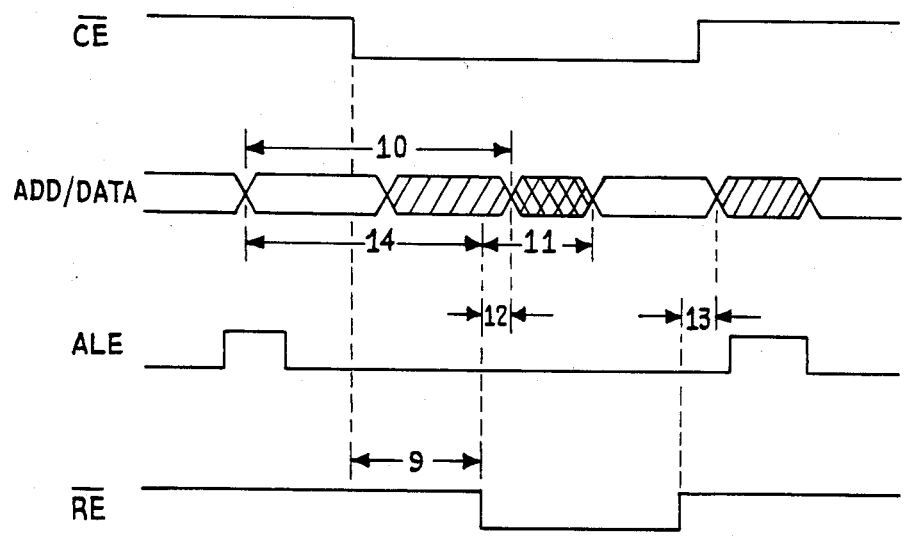
FIG. 10 shows various waveforms concerned with the bus interface read cycle multiplex mode.

The following timings apply to the control interface of the c.p.c. generator detector. Timing numbers refer to FIG. 9 and FIG. 10. All timings are given in nano seconds.

| | Ale Timing | | |
|---|---|---|---|
| Timing Number | Parameter | Min | Max |
| 1 | Address setup before ALE low | 29 | |
| 2 | Address hold after ALE low | 26 | |
| 3 | ALE pulse width | 26 | |

Write Access

| Timing Number | Parameter | Min | Max |
|---|---|---|---|
| 4 | Required address setup before $\overline{WE}$ | | |
| (a) | multiple address | 68 | |
| (b) | non-multiplex address | 47 | |
| 5 | data setup before $\overline{WE}$ | 50 | |
| 6 | Add/CE/Data hold after $\overline{WE}$ | 40 | |
| 7 | $\overline{CE}$ setup before $\overline{WE}$ | 82 | |
| 8 | $\overline{WE}$ Pulse width | 84 | |

Read Access

| Timing Number | Parameter | Min | Max |
|---|---|---|---|
| 9 | $\overline{CE}$ setup before $\overline{RE}$ | 0 | |
| 10 | Address to data valid | | |
| (a) | multiplex address | | 184 |
| (b) | non-multiplex address | | 163 |
| 11 | Read to data valid | | 195 |
| 12 | Read to data drive | | 66 |
| 13 | Read to data tristate | | 76 |
| 14 | Required address setup before $\overline{RE}$ | 0 | |

Interrupt Timing

| Parameter | Min | Max |
|---|---|---|
| Interrupt clear from $\overline{RE}$ low | | 156 |
| Interrupt from $\overline{MEG}$ low | 131 | |

C.P.C. Detector Timing

The c.p.c. detector sampling point is programmed via the control interface, sampling point timing is shown in FIG. 8, detailed timing is as follows:

| Parameter | Min | Max |
|---|---|---|
| Traffic setup before $\overline{MEG}$ low | 52 | |
| Traffic hold after $\overline{MEG}$ low | 120 | |

Clock Timing

| Parameter | Min | Max |
|---|---|---|
| $\overline{FMG}$ setup before $\overline{MEG}$ | 38 | |
| $\overline{FMG}$ hold after $\overline{MEG}$ | 38 | |
| $\overline{MEG}$ High to $\overline{FMG}$ active | 38 | |
| $\overline{FMG}$ inactive to $\overline{MEG}$ | 25 | |
| $\overline{MEG}$ high to CKA-CKF valid | | 112 |

Maximum frequency of the clock input ($\overline{MEG}$) is 3.7 MHz.

Traffic Timing

| Parameter | Min | Max |
|---|---|---|
| MEG high to data out valid | | 165 |
| Propagation delay Port A to Port B (traffic Mode) | | 60 |
| Propogation delay Port B to Port A (traffic Mode) | | 66 |
| $\overline{RES}$ to device tristate | | 172 |
| $\overline{RES}$ Pulse width | 63 | |
| Software reset to device tristate (from WE) | | 234 |

CIRCUIT IMPLEMENTATION

Referring to FIG. 11 to FIG. 14.

Control Area

Figure 11:
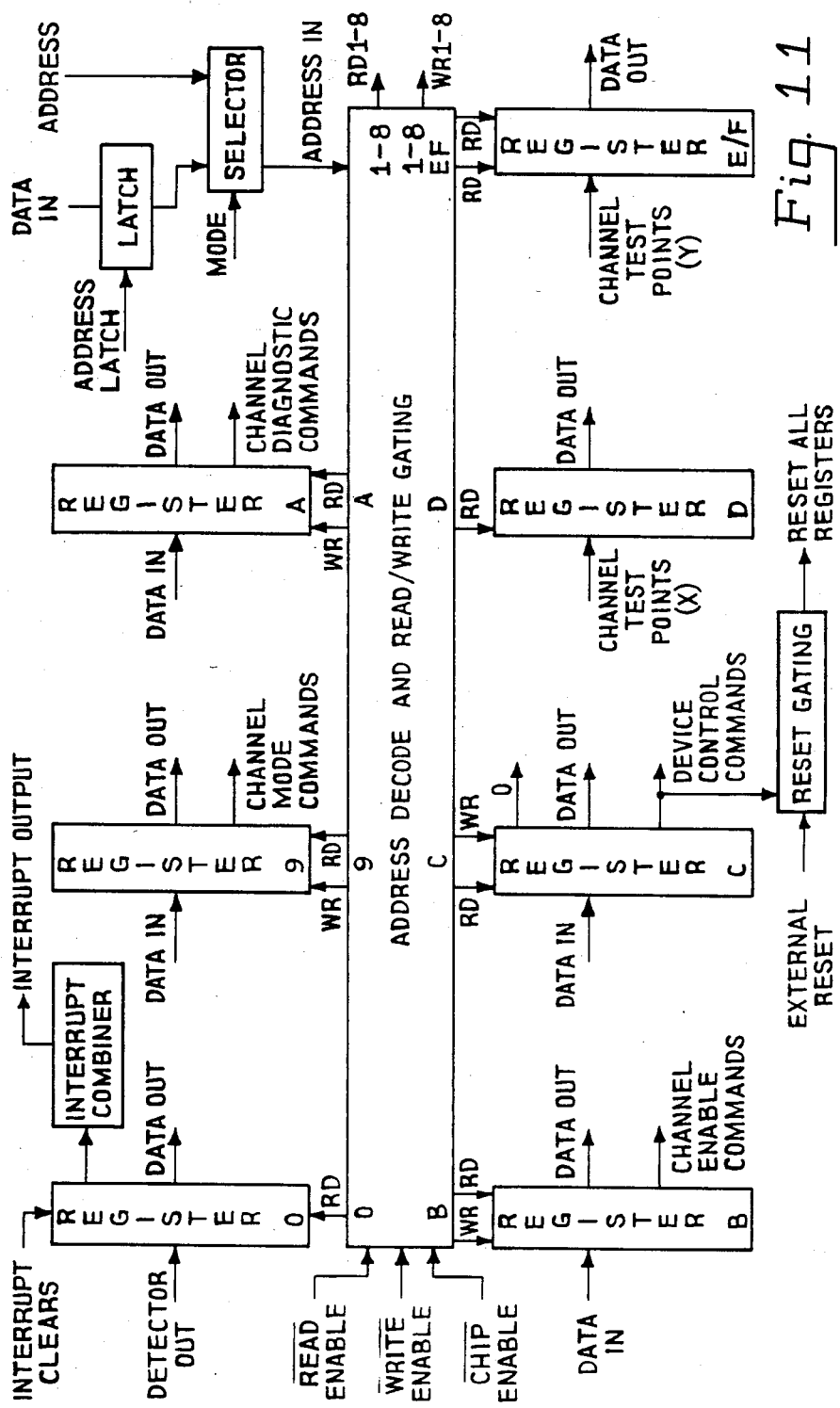
FIG. 11 shows a block schematic diagram of the control area.

All command registers use transparent latches. Each command register receives an enable pulse only if $\overline{CE}$ and $\overline{WE}$ are low and the appropriate address has been loaded. FIG. 11 shows a block diagram of all command and status registers common to every channel. All these registers are read directly by setting the appropriate address and holding $\overline{CE}$ and $\overline{RE}$ low.

Clock Supply Area

Figure 12:
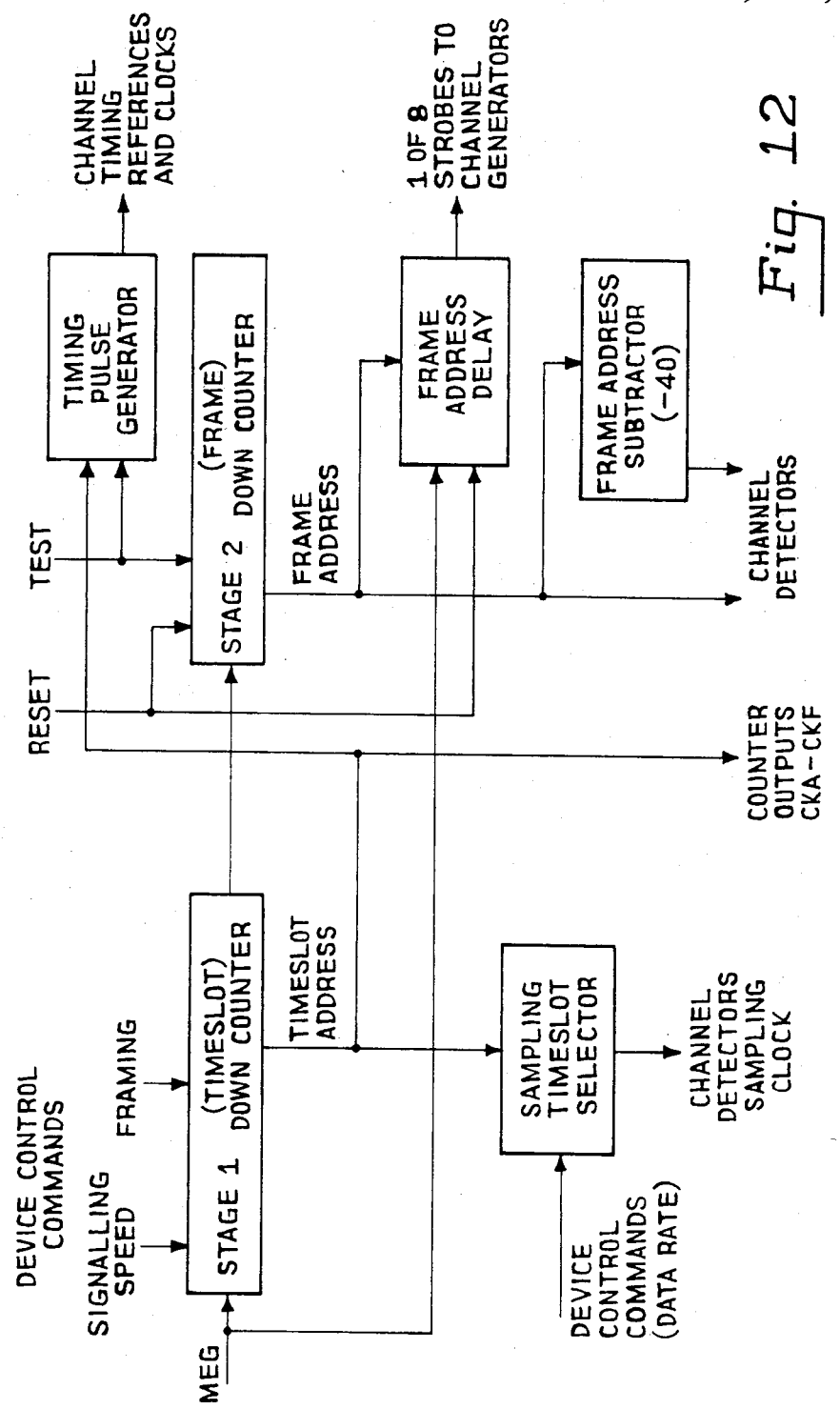
FIG. 12 shows a block schematic diagram of the clock supply area.
Figure 13:
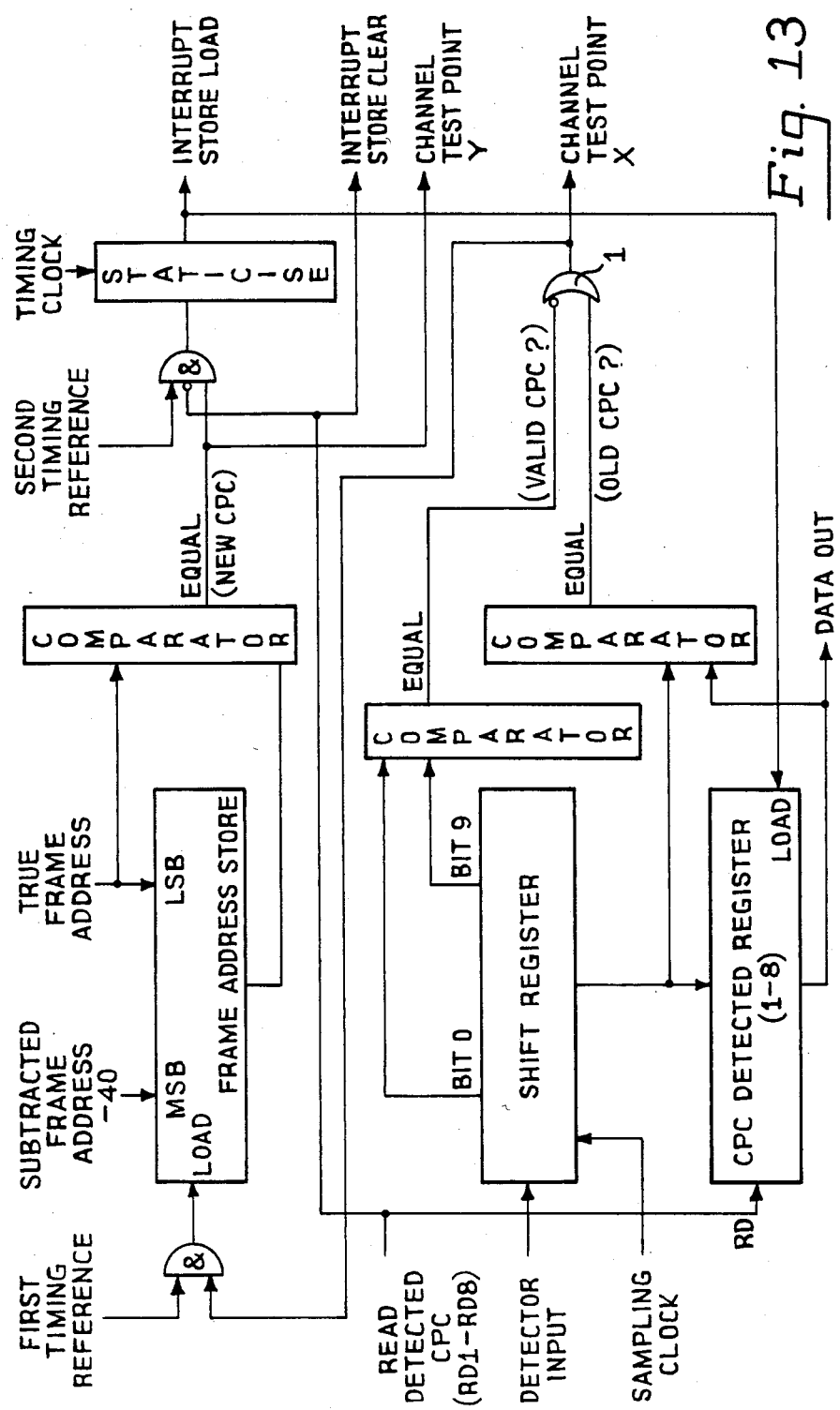
FIG. 13 shows a block schematic diagram of the channel detector.

Referring to FIG. 12, this consists of two cascaded down counters (Stage 1 and Stage 2). Stage 1 is synchronously cleared using the framing input (FIG. 8). This is a timeslot counter that synchronises all operations between consecutive bits of received c.p.c. data. It is used to determine the sampling point used by the detectors and to transmit two reference pulses that time the handling of interrupt calls. A borrow output feeds the second stage frame counter. This counts the number of frames (bits of c.p.c.) that pass and also provides a subtracted count. The first 3 bits of the second stage counter are delayed and demultiplexed into a one-of-eight code for the channel c.p.c. generators. The Stage 2 counter is cleared by the hardware or software reset inputs. If the test input is held low then the carry input to Stage 2 is forced active and the generators operate at the same speed as the Stage 1 counter. The test pin is not intended to facilitate testing of the receiver section, it is therefore recommended that any test program that uses the test input should also hold $\overline{FMG}$ low to prevent race hazards (this stops the Stage 1 counter).

Channel Detector

Six detectors (FIG. 13) are provided, one for each channel. Basic operation is as follows. The sampling clock forces serial data to be shifted along a 9 bit shift register. A comparator compares bits 0 to 9 to determine if a c.p.c. is present, another comparator compares the shift register contents (first 8 bits) to the data in the 'c.p.c. received' status register. If these comparators indicate that the c.p.c. is (a) invalid or (b) most recently received or old then a load pulse will be sent to the frame address store. Upon receipt of a load pulse the frame address store is loaded with the frame count −40.

Figure 15:
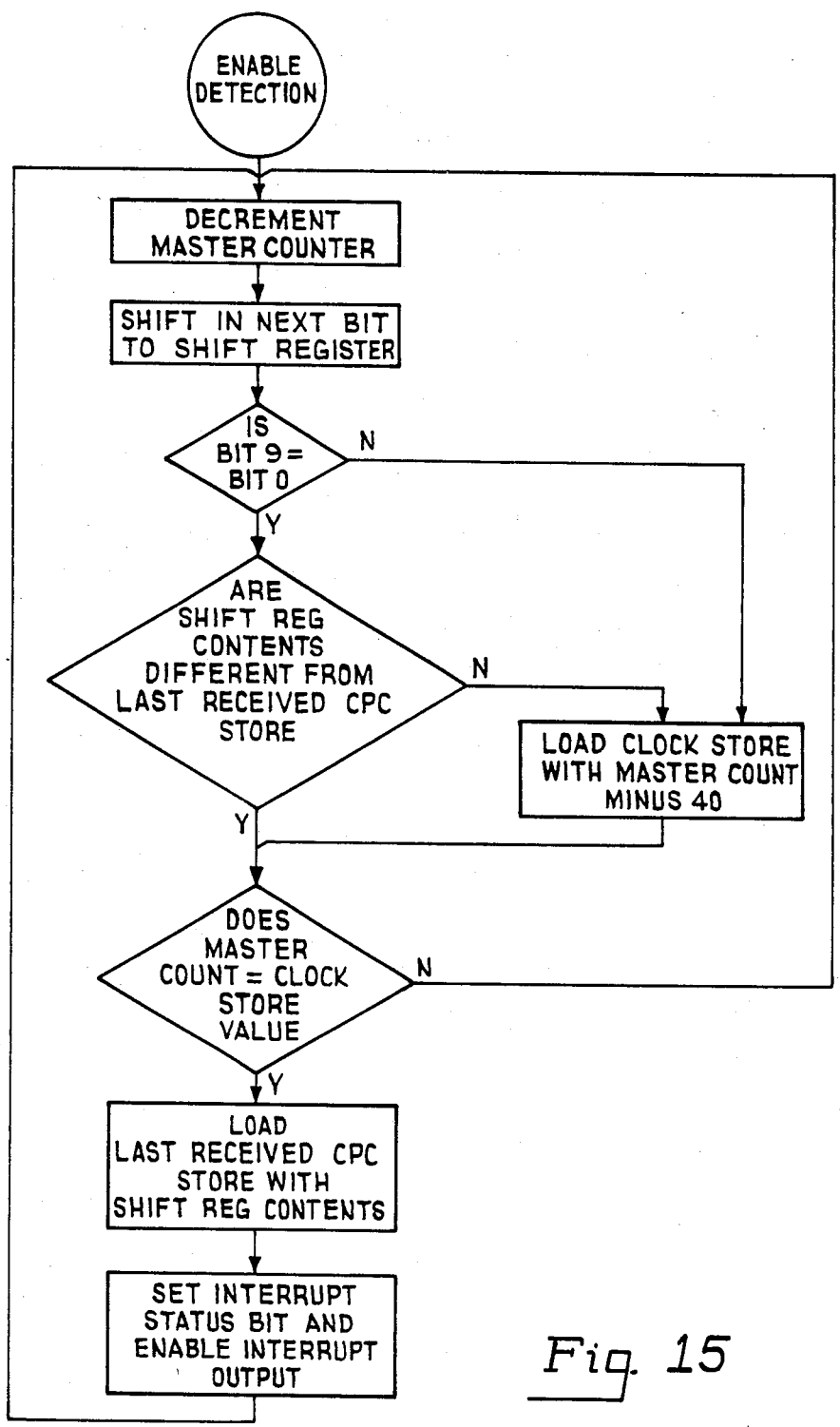
FIG. 15 shows a flow diagram of the c.p.c. detector sequence.

A third comparator compares the frame address store value with the true count, thus if a subsequent or new c.p.c. has been valid for 40 frame counts a 'new c.p.c.' pulse will be generated by this comparator. This output is gated with Read enable to prevent read access violation. The detection sequence results in interrupt status (register and pin) outputs and the 'c.p.c. received' store being loaded with the shift register contents. The channel detection sequence is illustrated by the flow diagram shown in FIG. 15.

Channel Register

Figure 14:
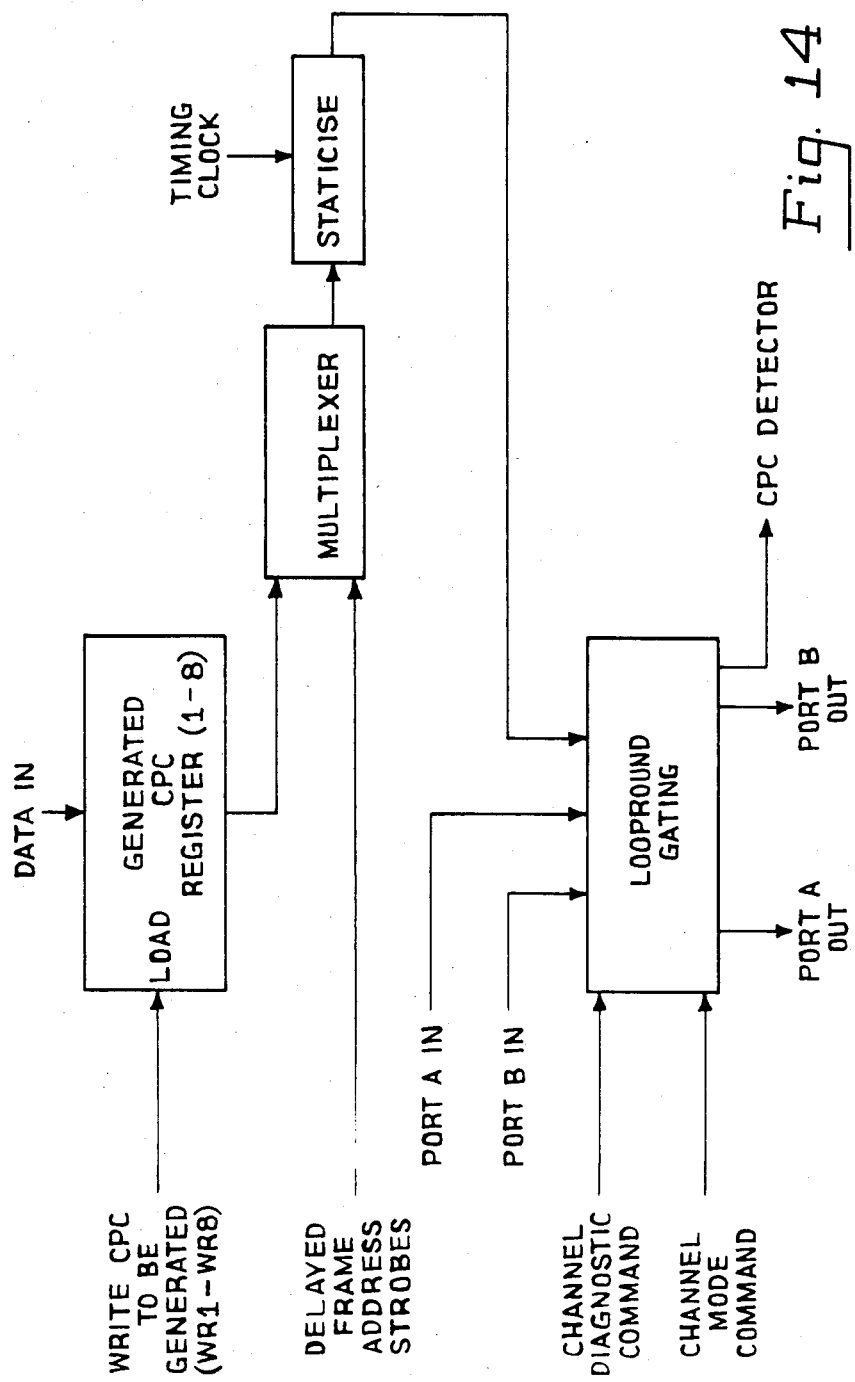
FIG. 14 shows a block schematic diagram of the channel generator.

Data to be transmitted is loaded into an 8 bit register (transparent latches). Frame address count strobes are used to multiplex this into a serial data stream, hence all channels transmit synchronously (FIG. 14). Loopround gating allows c.p.c. data to be transmitted or received from a variety of ports under control of the mode and diagnostic command register contents.

I claim:

1. A digital telecommunications system, comprising:
a subscriber line interface module for coupling a plurality of independent subscriber paths to a common time division multiplex (TDM) path, the module including a microprocessor responsive to a system control, an interface means connecting the separate subscriber paths to the common TDM path, and a subscriber line signalling device coupled to the interface means and operating under the control of the microprocessor and including:
a cyclically permutable codeword generator allocated to each subscriber path for inserting the codeword in serial format into the serial data stream of the path;
a cyclically permutable codeword detector allocated to each subscriber path including register means for receiving an incoming serial data stream, means for comparing the data stream with a cyclically permutable codeword stored in register means whereby to recognize a cyclically permutable codeword in the data stream recurring a predetermined number of times; and,
a common clock timing means for issuing timing and control signals to all of said detectors and generators of the signalling device for regulating their operation.

2. A system as claimed in claim 1 wherein said common clock timing means comprises means responsive to the framing pulse signal of the TDM system, and a counter responsive to frame address signals of the TDM system for issuing appropriate timing signals to said detectors and generators.

3. A system as claimed in claim 1, in which each cyclically permutable codeword detector is arranged to recognise a serial data stream comprising any word repeated (n) times and upon such code being detected a signal is transmitted to said microprocessor.

4. A system as claimed in claim 1, in which in each cyclically permutable codeword generator a word is loaded by a control interface to a channel address, the word being multiplexed into a serial data stream.

5. A system as claimed in claim 1 in which the detector comprises a first register means for receiving serial data, second register means for storing a detected cyclically permutable codeword, first comparator means for determining if a cyclically permutable codeword is present in said first register means, second comparator means for comparing the contents of the first register means with the contents of the second register means, wherein if the first and second comparators indicate that a cyclically permutable codeword is valid for (n) word repetitions an interrupt signal is generated and the first register means contents are transferred to the second register means.

6. A system as claimed in claim 5 wherein said common clock timing means comprises means responsive to the framing pulse signal of the TDM system, and a counter for counting a predetermined number of frame addresses and for issuing a timing signal to each said cyclically permutable detector, each detector including third register means for receiving said timing signal to enable to determine the elapsing of (n) word repetions.

7. A system as claimed in claim 4, in which the cyclically permutable codeword generator comprises register means for storing said word, and multiplexer means, wherein said word is multiplexed into channels of said serial data stream by frame address strobe signals generated from said clock timing means which is located within the subscriber line interface device and which is driven from a master clock source of the digital telecommunications exchange system.

8. A system as claimed in claim 7, in which the serial data stream can be transmitted or received from various input and output ports of the device in accordance with the selection of particular command signals.

9. A system as claimed in claim 8, in which the command signals comprise mode commands which are applied to mode command register means for controlling the operational mode of said plurality of channels and diagnostic commands which are applied to diagnostic command register means for controlling the diagnostic facility of said plurality of channels.

10. A system as claimed in claim 9, in which self test, bus test, signalling and traffic selections are available for both mode and diagnostic commands.

11. A system as claimed in claim 10, in which the device is operable in any one fo a plurality of selectable data rates controlled by data rate commands applied to a device control register means.

12. A system as claimed in claim 11, in which the device control register means has a single-bit alternative setting giving a data rate operation of 16 kbit per second and 32 kbit per second respectively and two further bits whose four possible alternative settings provide four different data rate clock sampling points for employment by the channel detectors.

13. A subscriber line signalling device for use in a subscriber line interface module of a digital telecommunications system in which the device, being controlled by a microprocessor, is arranged to generate and detect cyclically permutable code words on any of a plurality of independent traffic channel paths to or from the device respectively, each generated cyclically permutable codeword on any one traffic channel path being synchronously coded with respect to any other channel of the plurality of traffic channel paths by clock timing means, in which a cyclically permutable codeword detector is allocated to each channel path, the detector being arranged to recognise a serial data stream comprising any eight-bit word repeated six times and upon such code being detected a signal is transmitted to said microprocessor, in which the detector comprises a first register means for receiving serial data, second register means for storing a detected cyclically permutable codeword, first comparator means for determining if a cyclically permutable codeword is present in said first register means, second comparator means for comparing the contents of the first register means with the contents of the second register means, third register means for storing a frame address count and a true frame address and third comparator means for comparing the frame address count with the true frame address, wherein if the first and second comparators indicate that a cyclically permutable codeword is invalid or old the third register means is loaded with a frame count of minus forty and wherein the third comparator means compares the frame address count with the true frame address such that when a subsequent or new cyclically permutable codeword is valid for forty frame counts an interrupt signal is generated and the first register means contents are transferred to the second register means.

* * * * *